US012804043B2

(12) United States Patent
Grasreiner et al.

(10) Patent No.: US 12,804,043 B2
(45) Date of Patent: Nov. 17, 2026

(54) METHOD FOR DETERMINING OBD COMPLIANCE OF AN OUTPUT SIGNAL

(71) Applicant: Bayerische Motoren Werke Aktiengesellschaft, Munich (DE)

(72) Inventors: Sebastian Grasreiner, Miesbach (DE); Stefan Uhl, Marzling (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 178 days.

(21) Appl. No.: 18/834,577

(22) PCT Filed: Jan. 23, 2023

(86) PCT No.: PCT/EP2023/051515

§ 371 (c)(1),
(2) Date: Jul. 30, 2024

(87) PCT Pub. No.: WO2023/169727

PCT Pub. Date: Sep. 14, 2023

(65) Prior Publication Data

US 2025/0112971 A1 Apr. 3, 2025

(30) Foreign Application Priority Data

Mar. 7, 2022 (DE) ..................... 10 2022 105 248.6

(51) Int. Cl.
*H04L 67/12* (2022.01)
*B60R 16/023* (2006.01)
*G07C 5/08* (2006.01)

(52) U.S. Cl.
CPC .......... *H04L 67/12* (2013.01); *B60R 16/0231* (2013.01); *G07C 5/0808* (2013.01)

(58) Field of Classification Search
CPC ... H04L 67/12; B60R 16/0231; G07C 5/0808; G07C 5/0816; G06F 11/26
See application file for complete search history.

(56) References Cited

U.S. PATENT DOCUMENTS 5,671,141 A * 9/1997 Smith .................... B60W 10/04 701/1
8,213,321 B2 * 7/2012 Butts .................... H04L 41/0659 370/242

(Continued)

FOREIGN PATENT DOCUMENTS

DE 10361072 A1 3/2005
DE 102005044236 A1 * 3/2007 ......... G05B 23/0256

(Continued)

OTHER PUBLICATIONS

DE 102005044236 A1 translation (Year: 2007).*

(Continued)

*Primary Examiner* — Frederick M Brushaber
(74) *Attorney, Agent, or Firm* — Maginot, Moore & Beck LLP

(57) ABSTRACT

A method and system is disclosed herein for determining whether at least one output signal of a controller of a vehicle is on-board diagnostics compliant. The method includes a controller in a vehicle which uses a signal network, which represents a signal flow in the controller, the signal network comprising at least one input signal and the at least one output signal. The method further includes checking whether a signal connection exists between the at least one input signal and the at least one output signal, and checking whether the at least one input signal is on-board diagnostics compliant. The method further includes indicating that the at least one output signal is on-board diagnostics compliant when the signal connection exists between the at least one input signal and the at least one output signal and when the at least one input signal is on-board diagnostics compliant.

12 Claims, 3 Drawing Sheets

(56) References Cited

U.S. PATENT DOCUMENTS

| | | | | |
|---|---|---|---|---|
| 2007/0174749 A1* | 7/2007 | Jaworski | G07C 5/085 | 714/727 |
| 2007/0192489 A1* | 8/2007 | Rittle | G06F 8/61 | 709/226 |
| 2008/0005706 A1* | 1/2008 | Sharma | H04L 1/203 | 716/136 |
| 2008/0148231 A1* | 6/2008 | Weber | G06F 11/324 | 714/E11.202 |
| 2008/0186870 A1* | 8/2008 | Butts | H04L 43/0847 | 370/252 |
| 2017/0206718 A1* | 7/2017 | Kapoor | G07C 5/0808 | |
| 2019/0171381 A1* | 6/2019 | Ioannou | G06F 3/0679 | |
| 2021/0144165 A1* | 5/2021 | Palumbo | G06F 21/554 | |
| 2025/0115197 A1* | 4/2025 | Grasreiner | H04L 41/24 | |

FOREIGN PATENT DOCUMENTS

| | | | |
|---|---|---|---|
| DE | 102007004634 A1 | 9/2007 | |
| DE | 102006046399 A1 | 4/2008 | |
| DE | 102018117509 A1 * | 1/2020 | G06F 8/71 |

OTHER PUBLICATIONS

DE 102018117509 A1 translation (Year: 2020).*

International Search Report corresponding to International Patent Application No. PCT/EP2023/051515, dated Apr. 17, 2023 (4 pages).

Written Opinion corresponding to International Patent Application No. PCT/EP2023/051515, dated Apr. 17, 2023 (7 pages).

German Search Report corresponding to German Patent Application No. 10 2022 105 248.6, dated Dec. 2, 2022. (5 pages).

* cited by examiner

30

| | OBD compliance InSens | | | OBD compliance OutBus |
|---|---|---|---|---|
| | is1 | is2 | is3 | ob1 |
| 31 | y | y | y | y |
| 32 | y | n | y | n |
| 33 | n | n | n | n |
| 34 | y | <na> | y | n |

Fig. 3

40

| | OBD compliance InBus | | | OBD compliance OutBus |
|---|---|---|---|---|
| | ib1 | ib2 | ib3 | ob1 |
| 41 | y | y | y | y |
| 42 | y | n | y | n |
| 43 | n | n | n | n |
| 44 | y | y | <na> | <na> |

Fig. 4

METHOD FOR DETERMINING OBD COMPLIANCE OF AN OUTPUT SIGNAL

CROSS-REFERENCE TO RELATED APPLICATIONS

The present application is the U.S. national phase of PCT Application PCT/EP2023/051515 filed on Jan. 23, 2023, which claims priority of German patent application No. 10 2022 105 248.6 filed on Mar. 7, 2022, the entire contents of which are incorporated herein by reference.

FIELD

The present disclosure is related to vehicles, and exemplary embodiments disclosed herein relate to a method for determining whether at least one output signal of a controller of a vehicle is on-board diagnostics (OBD) compliant. The method can advantageously be used iteratively in order to be able to more easily analyze highly complex systems having many controllers. Further examples relate to a computer program product for performing the method.

BACKGROUND

In modern motor vehicles, a multiplicity of interconnected controllers are used. Some signals transmitted in the on-board electrical system can have an influence on the emissions of the vehicle. Therefore, when vehicles are approved, the signal characteristics of these signals need to be disclosed.

Hereinbelow, important signal characteristics are combined under the term on-board diagnostics (OBD) characteristics. This vehicle diagnostics system makes it possible to monitor, while the vehicle is driving, the signals of devices which have an influence on the exhaust gas. Errors that occur are indicated to the driver via a warning light and stored in the respective controller. Error messages can be queried, e.g., when the vehicle is serviced. In the process of approving the vehicle, it is necessary to verify that relevant signals are OBD compliant, i.e. that the monitoring of these signals meets legal requirements.

One difficulty in this verification can be the enormous complexity of modern on-board electrical systems having a multiplicity of controllers which are often designed and manufactured by different companies. It may be the case that distributed systems having thousands of interacting signals and millions of signal connections have to be checked for their OBD compliance. Consequently, it may be very difficult in such complex systems to verify whether a particular output signal of a particular controller of the system is OBD compliant or not. The term “OBD compliance” can be understood to mean that a signal is monitored in accordance with a particular piece of legislation with respect to a malfunction which may result in a worsening of emissions.

SUMMARY

In view of the foregoing, it would be advantageous to provide concepts which allow for easier verification that an output signal of a controller is OBD compliant, even in complex systems.

Correspondingly, a method for determining whether at least one output signal of a controller of a vehicle is on-board diagnostics (OBD) compliant is proposed. The controller can be part of a complex on-board electrical system of the vehicle. The method comprises using a signal network, e.g. a graphical signal network, which represents a signal flow to the controller, within the controller, and away from the controller. Said signal network comprises at least one input signal and the at least one output signal. Furthermore, the method comprises checking whether a signal connection exists between the at least one input signal and the at least one output signal and checking whether the at least one input signal is on-board diagnostics compliant. Finally, provision is made to indicate that the at least one output signal is on-board diagnostics compliant if a signal connection exists between the at least one input signal and the at least one output signal and if the at least one input signal is on-board diagnostics compliant. The output signal is only fully OBD compliant, for instance, if all of the signals forming it have been observed to be OBD compliant. In the case of a plurality of input signals, for example, this involves an AND function of the OBD compliance—only if all are observed to be OBD compliant is the output thus OBD compliant.

For example, the at least one input signal is a sensor signal which is applied to a signal input of the controller. In the case of sensor signals, it is possible to know whether the input signal is OBD compliant or not since direct knowledge about the development and type of the sensor or of the sensor device used may be available from the manufacturer. It can therefore be particularly easy to ascertain whether the output signal is OBD compliant or not.

For example, the at least one input signal is a bus signal which is applied to a signal input of the controller. In this case, information may be available about whether the bus signal is OBD compliant, e.g. if knowledge about a further controller transmitting the bus signal exists. If no knowledge about the output signal of the further controller exists, the proposed method can in turn advantageously be used to obtain this knowledge. In other words, it is possible to determine whether the output signal of the further controller is OBD compliant or not.

Accordingly, in a preferred example, an iterative method for analyzing a complex signal network is proposed. If the at least one input signal of the controller is an output signal of a further controller, it is iteratively determined whether the output signal of the further controller is on-board diagnostics compliant. For this purpose, the connections of the output signal of the further controller to input signals of the further controller can be checked and the OBD compliance of the input signals of the further controller can be monitored. The OBD compliance of the output signal of the further controller can then in turn be indicated according to the method proposed here.

In particularly complex systems, it is furthermore possible to iteratively determine whether a further output signal, which is applied to the further controller as an input signal, is also on-board diagnostics compliant. In this way, it is possible to examine the entire system successively in simple individual steps, with the result that the influence of all of the relevant signals on that output signal of the controller which is to be examined can be determined.

According to one example, provision can be made for the iterative determination to be stopped as soon as all of the input signals used in this case are exclusively sensor signals. In this case, the iteration can go back until knowledge about all of the sensor signals used exists. This can ensure particularly reliable information about the OBD compliance of the output signal.

In other examples, iteration up to original sensor signals may be too extensive and, e.g., may not be required for the determination. Therefore, provision can also be made for the iterative determination to be stopped as soon as an output signal of a controller which is only indirectly connected to the controller via the further controller is indicated as on-board diagnostics compliant. This may be the case if all of the output signals from controllers which are two controllers (or three or more controllers) away in the signal chain are on-board diagnostics compliant. In this case, the influence of signals which are further away (which are possibly not on-board diagnostics compliant) on the controller which is to be considered may be low such that relevant, actual effects on the output signal which is to be examined can be excluded (e.g. not necessary for the required verification of the OBD compliance of the output signal which is to be examined; e.g. if the output signal itself only has a low influence on the resulting emission of the vehicle).

In addition to the two described stop criteria of the iterative method, a third stop criterion can be used. For example, there are controllers which have no signal network which could be evaluated. In this case, e.g., the output signals may all be assessed as "not OBD compliant" and the iteration may end. As a result, a worst-case scenario may be portrayed. If the thus determined characteristic of the output signal is still satisfactory, it may be used since in practice the actual value can only be better.

Furthermore, alternatively or in addition, a fourth stop criterion can be used. For example, in a complex system, not every controller is counted among the so-called OBD group. This means that no OBD diagnosis is partitioned outside of this group. Should in the iterative signal flow a controller which is not positioned in the OBD group provide an output signal, the iteration can then be ended.

Owing to the proposed stop criteria, an excessively long method for determining the OBD compliance can be avoided and it is still possible to indicate with sufficient reliability whether the output signal is OBD compliant or not.

According to one example, the signal network can have a plurality of input signals (e.g. both bus signals and sensor signals) and the at least one output signal is only indicated as on-board diagnostics compliant if the entire plurality of the input signals connected to the at least one output signal are on-board diagnostics compliant. This can make it possible to analyze output signals from controllers having a plurality of inputs. For example, controllers having sensor signals and bus signals as input signals can be analyzed.

For example, the at least one output signal is a signal which is output on a bus line connected to the controller. It may be an out-bus signal or else an out-act signal (actuator signal) which is assessed.

Examples relate to a computer program which has a program code to perform a disclosed method when the computer program is executed on a processor, a computer or programmable hardware. Such a computer program may advantageously be provided in the development and documentation of controllers and executed.

BRIEF DESCRIPTION OF THE DRAWINGS

Exemplary embodiments are explained in more detail below with reference to the attached figures, in which:

FIGS. 3 and 4 show examples of OBD compliances of an output signal of the signal network which have been ascertained according to the method for various input signals;

DESCRIPTION

Various exemplary embodiments will now be described in more detail with reference to the attached drawings in which some exemplary embodiments are illustrated. In the figures, the thickness dimensions of lines, layers and/or regions may be illustrated in an exaggerated manner for the sake of clarity. In the following description of the attached figures, which only show some exemplary embodiments, the same reference signs may refer to the same or comparable components.

An element which is referred to as being "connected" or "coupled" to another element may be connected or coupled directly to the other element or intermediate elements may be present. Unless defined otherwise, all of the terms used here (including technical and scientific terms) have the same meaning as attributed to them by an average person skilled in the art in the field to which the exemplary embodiments belong. The use of the female gender for reasons of gender-specific diversity does not rule out that male persons can also be involved or meant. In particular, it applies for the entire disclosure that instead of a female user, a male user is likewise also disclosed.

Figure 1:
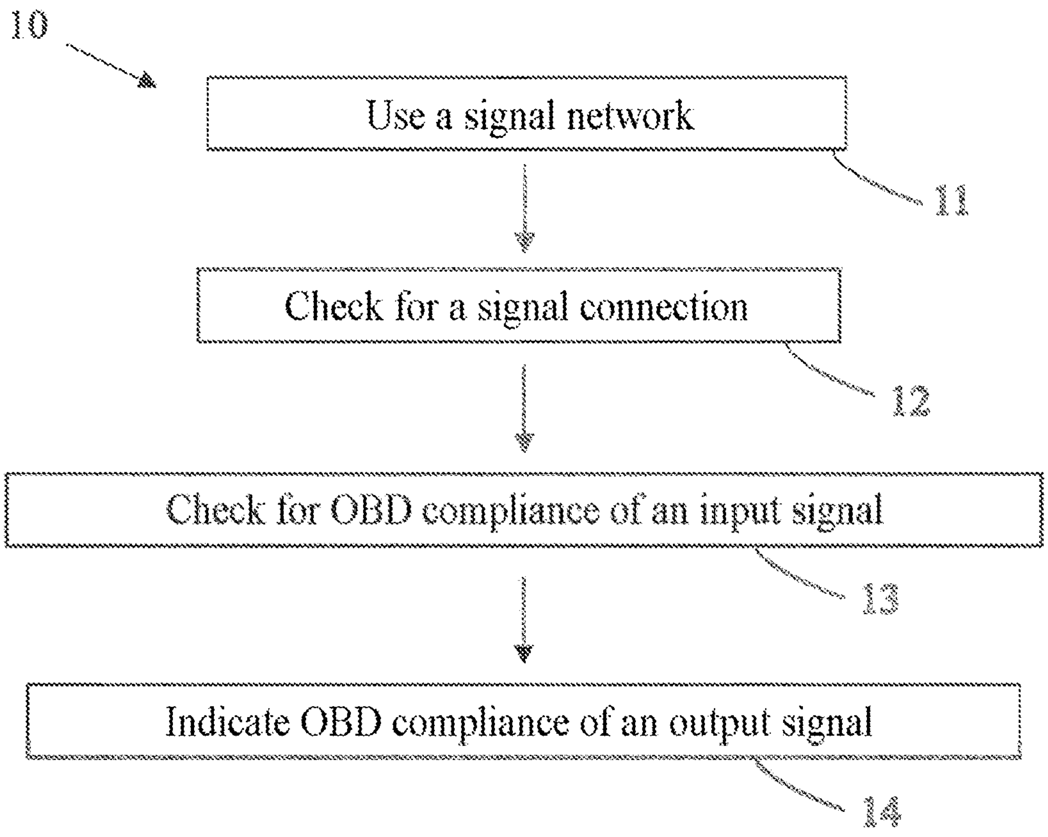
FIG. 1 shows a flowchart of a method for determining whether an output signal of a controller is OBD compliant.

FIG. 1 shows a flowchart of a method 10 for determining whether an output signal of a controller is OBD compliant. The method 10 comprises using 11 a signal network which represents a signal flow in the controller. For this purpose, the signal network comprises at least one input signal and the at least one output signal. Furthermore, it is checked 12 whether a signal connection exists between the at least one input signal and the at least one output signal and checked 13 whether the at least one input signal is on-board diagnostics compliant. Finally, provision is made for indicating 14 that the at least one output signal is on-board diagnostics compliant if a signal connection exists between the at least one input signal and the at least one output signal and if the at least one input signal is on-board diagnostics compliant.

The proposed method 10 makes it possible to assess unknown signal characteristics. For example, an assessment of the signal characteristics over a plurality of connected signal networks on the basis of signal flow paths and the direction thereof and known signal characteristics of annotated nodes of the signal network may be necessary or a transfer of characteristic values at interfaces between a plurality of signal networks may be necessary. In this case, an iterative procedure which can be advantageously carried out using the proposed method 10 may be required.

The method 10 can use a representation of software (e.g. controllers software) as graphical signal networks having nodes (=signal) and edges (=connections between signals) in a uniform format (for example particular machine-readable XML formats). Use can likewise be made of data retention of signal networks in databases with query logic (for example Neo4J), annotation of characteristic values at certain nodes, or searching for paths between two determined nodes in the network (also possible as serial batch processing between a plurality of node tuples).

Through the use of the method 10, a detailed disclosure of signal characteristics (e.g. OBD characteristics) can take place. Ascertaining these characteristics is in part associated with great expense and high complexity since all of the signals/variables of a software have to be placed in connection with one another because they can mutually influence each other (often more than 100,000 signals and several million connections therebetween). By way of the method 10, an "inheritance" or passing on of signal characteristics along the signal flows may take place in an automated manner in such cases.

According to one example, a computer program having a program code to perform the method 10 when the computer program is executed on a processor, a computer or programmable hardware is also proposed for the method 10.

Figure 2:
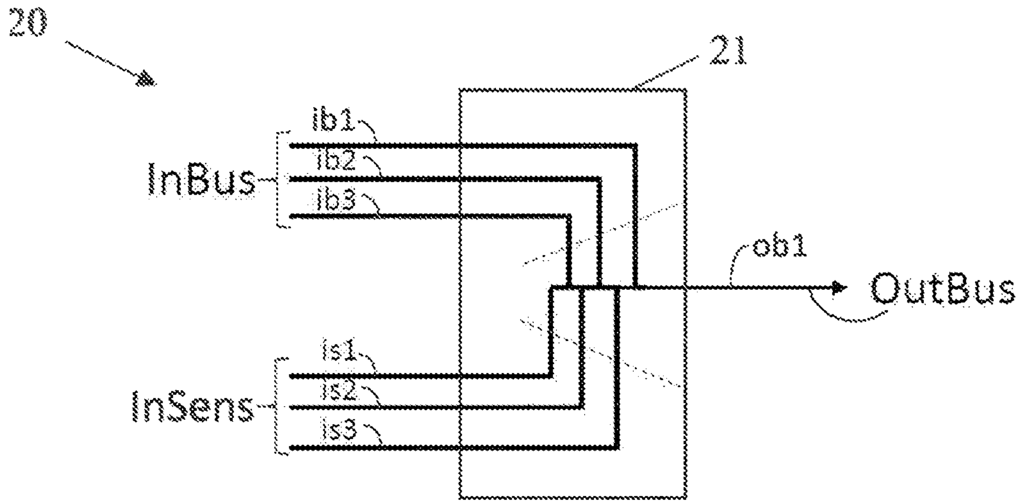
FIG. 2 shows an example of a signal network of a controller.

FIG. 2 shows an example of a signal network 20 of a controller 21. The signal network 20 has a plurality of signal inputs, three bus inputs InBus (e.g. for receiving input signals received via a bus or another signal line) and three sensor inputs InSens (e.g. for receiving input signals received directly from sensors or sensor devices). The at least one bus input InBus can, for instance, receive various signals ib1, ib2 and ib3 (e.g. signals which are independent of one another; e.g. from various controllers) sent via one signal line (e.g. bus connection). The sensor input InSens can, for instance, receive various sensor signals (e.g. signals which are independent of one another; e.g. from various sensors or sensor devices).

The controller 21 is designed to output an output signal ob1 via a signal output OutBus. According to the method described above, it is now possible to test whether the output signal ob1 is on-board diagnostics compliant or not. For this purpose, it is checked which input signals the output signal is dependent on (to which input signals a signal connection exists) and whether all of these relevant input signals are each themselves on-board diagnostics compliant.

A specific example for assessing OBD compliance of an ECU (electronic control unit) output signal is described. OBD compliance here means that a signal is observed to be satisfactory in accordance with the legislation with respect to a malfunction which may result in a worsening of emissions. The sent bus output signal ob1 should be assessed. The signal ob1 is only OBD compliant if all of its inputs (i.e. connected signals upstream in the signal flow) are also OBD compliant. Here, there are, e.g., two types of inputs for the output signal: a) incoming "in" sensor values is1-is3; and b) incoming "in" bus messages ib1-ib3. Sensor values is1-is3 are assigned, e.g., a direct OBD characteristic (OBD compliant yes/no?; y/n?); this knowledge arises during the scope of the development process (a sensor signal is only OBD compliant if it has been developed with corresponding monitoring diagnoses; this may be known during the development of the sensor variables and this characteristic may be provided as information). Incoming bus messages ib1-ib3 have an indirect OBD characteristic (they are provided from another controller—arranged upstream in the signal flow—as an out-bus message (e.g. output signal of a further controller of the system) and are in part not directly observable). For this reason, an iterative reassessment of the relevant bus signal (e.g. one of ib1-ib3; see also example 44 in FIG. 4) with regard to its inflowing sensors and inbound bus signals located upstream in the signal flow has to be performed.

It is possible to introduce two different OBD attributes which can be ascertained individually and subsequently combined to form an "overall compliance". In one case a), the OBD compliance of the output signal ob1 output via the output OutBus is dependent on the input signals is1-is3 via input InSens. For this purpose, all of the connected input signals is1-is3 for ob1 are listed in a database query (so-called connection matrix). The stored OBD compliance is queried for each connected sensor of the input signals is1-is3. If all of the connected sensors are OBD compliant (BOOL AND function), ob1 is then also OBD compliant on the basis of the signals received specifically via its sensors (via input) InSens (see also FIG. 3). In the further case b), the OBD compliance of the OutBus output signal ob1 is dependent on the input signals ib1-ib3. Here, all of the connected signals ib1-ib3 which have an influence on ob1 are listed in a database query. The OBD compliance can be ascertained again iteratively when required for each connected message ib1-ib3. For this purpose, for example, the proposed method 10 can be carried out on all upstream controllers until only sensors are still connected as original source of the signal. If all of the ib1-ib3 messages are ultimately OBD compliant (BOOL AND function), ob1 is then also OBD compliant on the basis of the signals received specifically via its input InBus. Here, the iterative method is advantageously applicable. At the end, for the signal ob1, the compliance information from the signal inputs InSens and InBus can be combined using a Boolean AND function (BOOL AND function) and the overall compliance of the ob1 signal can therefore be indicated.

Other specific examples with respect to this determination according to the method are illustrated in detail in the following FIGS. 3 and 4. In this case, in connection with FIG. 3, an example relating to the determination of the OBD compliance of the input signals of the sensor input InSens is illustrated (bus signals are ignored in this case). Here, the compliance can sometimes be conclusively determined since it is possible to know all of the signal characteristics with regard to OBD compliance of sensor signals. In connection with FIG. 4, an example relating to the determination of the OBD compliance of the input signals of the input InBus is illustrated (sensor signals are ignored in this case). Here, the compliance can sometimes not be conclusively determined immediately since it may be the case that not all of the signal characteristics with regard to OBD compliance of bus signals are known. In this case, the method 10 can advantageously be applied iteratively in order to be able to determine this information fully or to a sufficient degree. The OBD compliance of the output signal of the considered controller can nevertheless be assessed in this case by way of an iterative analysis which incorporates a plurality of controllers.

Further details and aspects are mentioned in connection with the exemplary embodiments described above or below. The exemplary embodiment shown in FIG. 2 may have one or more optional additional features which correspond to one or more aspects mentioned in connection with the proposed concept or with one or more exemplary embodiments described above (e.g. FIG. 1) or below (e.g. FIGS. 3-6).

FIGS. 3 and 4 show examples 30, 40 of OBD (on-board diagnostics) compliances of an output signal ob1 for various input signals is1, is2, is3, ib1, ib2, ib3 according to the signal network 20 illustrated in FIG. 2.

In first examples 31-34, only the input signals which are received via the input InSens are considered. In the first example 31, all of the three input signals is1-is3 are on-board diagnostics compliant. Correspondingly, all of the input signals connected to the output signal ob1 are OBD compliant and so, according to the method, the output signal ob1 is also indicated as OBD compliant with respect to its input sensors (in the table, y stands for yes, in the sense of "yes, OBD-compliant signal"). In the second example 32, the input signal is2, as one of the signals connected to output signal ob1, is not OBD compliant (in the table, n stands for no, in the sense of "no, non-OBD-compliant signal") and so, as a result, the output signal ob1 is also indicated as not being OBD compliant with respect to its input sensors. In the third example 33, none of the input signals is1-is3 is OBD compliant and so the output signal ob1 can also be indicated as not being OBD compliant. In a fourth example 34, no information about the OBD compliance of the input signal is2 exists (in the table, <na> stands for not available, in the sense of "no information with regard to OBD compliance is available"). The OBD compliance of the output signal ob1 therefore cannot be confirmed and it is indicated as not being OBD compliant.

In further examples 41-44, only the input signals which are received via the input InBus are considered. In the fifth example 41, all of the three input signals ib1-ib3 are on-board diagnostics compliant. Correspondingly, all of the input signals connected to the output signal ob1 are OBD compliant and so, according to the method, the output signal ob1 is also indicated as OBD compliant with respect to its received bus messages (in the table, y stands for yes, in the sense of "yes, OBD-compliant signal"). In the sixth example 42, the input signal ib2, as one of the signals connected to output signal ob1, is not OBD compliant (in the table, n stands for no, in the sense of "no, non-OBD-compliant signal") and so, as a result, the output signal ob1 is also indicated as not being OBD compliant with respect to its received bus messages. In the seventh example 43, none of the input signals ib1-ib3 is OBD compliant and so the output signal ob1 can also be indicated as not being OBD compliant.

In an eighth example 44, no information about the OBD compliance of the input signal ib3 exists (in the table, <na> stands for not available, in the sense of "no information with regard to OBD compliance is available"). This case usually occurs in the development of complex distributed software functions. The OBD compliance of the output signal ob1 therefore cannot be confirmed and the information "no information with regard to OBD compliance is available" is indicated. In this case, an iterative test can take place which can provide information about the OBD compliance of the signal ib3 (viewed as an output signal of a controller positioned upstream of the controller 21 in the signal flow: see, in addition, e.g., also FIGS. 5 and 6). This can make it possible to still determine the status with regard to OBD compliance of the output signal ob1 after the iterative step.

Further details and aspects are mentioned in connection with the exemplary embodiments described above or below. The exemplary embodiments shown in FIGS. 3 and 4 may have one or more optional additional features which correspond to one or more aspects mentioned in connection with the proposed concept or with one or more exemplary embodiments described above (e.g. FIGS. 1-2) or below (e.g. FIGS. 5-6).

Figure 5:
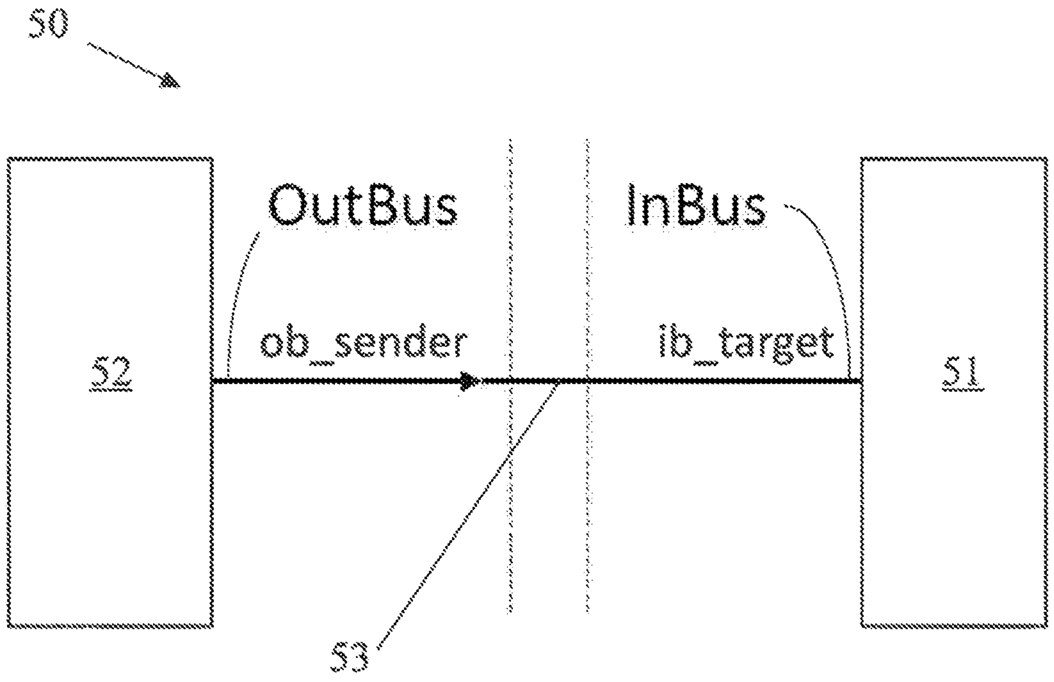
FIG. 5 shows an example of a network having two controllers connected via a bus.

FIG. 5 shows an example of a network 50 having two controllers 51, 52 connected via a bus 53. The second controller 52 (further controller) is arranged upstream of the first controller 51 in the signal flow. An input signal ib_target received at the first controller 51, which signal is received at the input InBus, is sent from the second controller 52 to the bus 53 as output signal ob_sender via the output OutBus.

If, while checking whether output signals of the first controller 51 are OBD compliant, it is determined that no information about the OBD compliance of the input signal ib_target is available (see also example 44 in FIG. 4), an iterative check can thus be made with regard to the output signal ob_sender from the perspective of the second controller 52 according to the proposed method steps.

In the example of FIG. 5, the input signal ib_target can be indicated as OBD compliant if the output signal ob_sender is OBD compliant since the bus signal is merely transmitted on the bus and its quality does not change. If the output signal ob_sender is not OBD compliant, the input signal ib_target is indicated as not being OBD compliant; if no information exists about whether the output signal ob_sender is OBD compliant or not, it is indicated that no information with regard to the OBD compliance of the input signal ib_target is available.

Further details and aspects are mentioned in connection with the exemplary embodiments described above or below. The exemplary embodiment shown in FIG. 5 may have one or more optional additional features which correspond to one or more aspects mentioned in connection with the proposed concept or with one or more exemplary embodiments described above (e.g. FIGS. 1-4) or below (e.g. FIG. 6).

Figure 6:
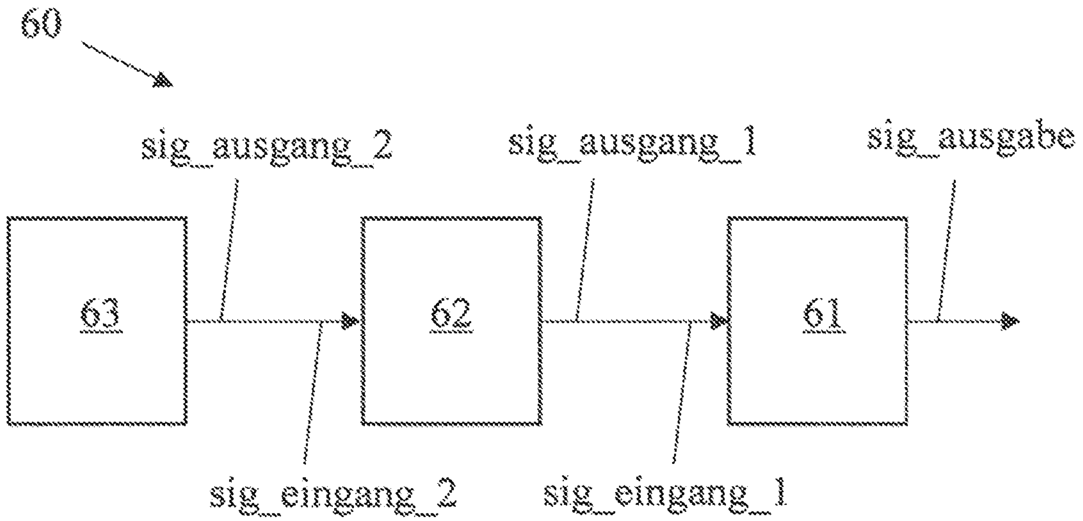
FIG. 6 shows an example of iterative determination of OBD compliance on the basis of a network having three controllers.

FIG. 6 shows an example 60 of iterative determination of OBD compliance on the basis of a network having three controllers 61, 62 and 63. The first controller 61 can send an output signal sig_ausgabe and receive an input signal sig_eingang_1 which is sent via a bus (or other signal line) from the second (or further) controller 62 as output signal sig_ausgang_1. The second controller 62 itself can in turn receive as input signal sig_eingang_2 a signal (e.g. bus signal) which is sent as further output signal sig_ausgang_2 from the third controller 63.

By iteratively checking for the OBD compliance of the various signals in the shown signal network, it is possible to ascertain whether the output signal sig_ausgabe of the first controller is also OBD compliant in the complex system. Each of the sent signals of the various controllers (e.g. second and third controller 62, 63) can be regarded, instead of as an output signal or further output signal in the nomenclature used, also itself as an output signal that is to be considered. The various designations in this application serve for the better understanding of the iterative method.

Further details and aspects are mentioned in connection with the exemplary embodiments described above or below. The exemplary embodiment shown in FIG. 6 may have one or more optional additional features which correspond to one or more aspects mentioned in connection with the proposed concept or with one or more exemplary embodiments described above (e.g. FIGS. 1-5) or below.

Examples can furthermore provide a computer program having a program code for performing one or more of the above methods when the computer program is executed on a computer or processor. Steps, operations or processes of various, above-described methods can be executed by programmed computers or processors. Examples can also cover program storage devices, e.g. digital data storage media, which are able to be read by a machine, processor or computer and encode machine-executable, processor-executable or computer-executable programs of instructions. The instructions execute some or all of the steps of the above-described methods or cause them to be executed. The program storage devices can comprise or be, e.g., digital memories, magnetic storage media such as for example magnetic disks and magnetic strips, hard disk drives or optically readable digital data storage media. Further examples can also cover computers, processors or control units which are programmed to execute the steps of the above-described methods, or (field-) programmable logic arrays ((F)PLAs) or (field-) programmable gate arrays ((F) PGAs) which are programmed to execute the steps of the above-described methods.

A functional block designated as "means for . . . ", which executes a particular function, may relate to a circuit which is designed to carry out a particular function. A "means for something" can therefore be implemented as a "means designed for or suitable for something", e.g. a device or a circuit which is designed for or is suitable for the respective task.

Functions of various elements shown in the figures, including each as functional blocks designated as "means", "means for providing a signal", "means for generating a signal", etc., can be implemented in the form of dedicated hardware, e.g. "of a signal provider", "of a signal processing unit", "of a processor", "of a controller", etc. and as hardware capable of executing software in connection with associated software. When being provided by a processor, the functions can be provided by a single dedicated processor, by a single jointly used processor or by a plurality of individual processors some or all of which may be jointly used. However, the term "processor" or "controller" is by far not limited exclusively to executing software-capable hardware but can comprise digital signal processor (DSP) hardware, a network processor, application-specific integrated circuit (ASIC), field-programmable logic array (FPGA=field-programmable gate array), read-only memory (ROM) for storing software, random-access memory (RAM) and a non-volatile storage device. Other hardware, customary and/or customer-specific, may also be included.

A block diagram may illustrate, for example, a detailed circuit diagram which implements the principles of the disclosure. In a similar way, a flowchart, a flow diagram, a state transition diagram, a pseudocode and the like may represent various processes, operations or steps which, for example, are essentially illustrated in a computer-readable medium and are thus executed by a computer or processor irrespective of whether such a computer or processor is explicitly shown. Methods disclosed in the description or in the patent claims can be implemented by a device which has a means for executing each of the respective steps of these methods.

The invention claimed is:

1. A method for determining whether at least one output signal of a controller of a vehicle is on-board diagnostics compliant, the method comprising:
- using a signal network, which represents a signal flow in the controller, comprising at least one input signal and the at least one output signal;
- checking whether a signal connection exists between the at least one input signal and the at least one output signal;
- checking whether the at least one input signal is on-board diagnostics compliant; and
- indicating that the at least one output signal is on-board diagnostics compliant when the signal connection exists between the at least one input signal and the at least one output signal and when the at least one input signal is on-board diagnostics compliant or, in the case of a plurality of input signals, when all of the input signals with a signal connection are on-board diagnostics compliant.

2. The method as claimed in claim 1, wherein the at least one input signal is a sensor signal which is applied to a signal input of the controller.

3. The method as claimed in claim 1, wherein the at least one input signal is a bus signal which is applied to a signal input of the controller.

4. The method as claimed in claim 1, wherein the signal network has a plurality of input signals, and the at least one output signal is only indicated as on-board diagnostics compliant if the entire plurality of the input signals connected to the at least one output signal are on-board diagnostics compliant.

5. The method as claimed in claim 1, wherein, when the at least one input signal of the controller is an output signal of a further controller, it is iteratively determined whether the output signal of the further controller is on-board diagnostics compliant.

6. The method as claimed in claim 5, wherein it is furthermore iteratively determined whether a further output signal, which is applied to the further controller as an input signal, is on-board diagnostics compliant.

7. The method as claimed in claim 6, wherein the iterative determination is stopped as soon as all of the input signals used in this case are exclusively sensor signals.

8. The method as claimed in claim 6, wherein the iterative determination is stopped as soon as an output signal of a controller which is only indirectly connected to the controller via the further controller is indicated as on-board diagnostics compliant.

9. The method of claim 1, wherein the at least one output signal is a signal which is output on a bus line connected to the controller.

10. The method as claimed in claim 1, wherein the signal network represents the signal flow in the controller as a model.

11. The method as claimed in claim 10, wherein checking whether the signal connection exists between the at least one input signal and the at least one output signal comprises checking whether the signal connection exists using the signal network.

12. A non-transitory computer readable medium for determining whether at least one output signal of a controller of a vehicle is on-board diagnostics compliant, wherein the computer-readable medium comprises instructions which, when executed on a controller, causes the controller perform the method as claimed in claim 1.

* * * * *